April 12, 1960
L. H. WHITNEY
2,932,207
CHAIN SPROCKET
Filed Sept. 26, 1957
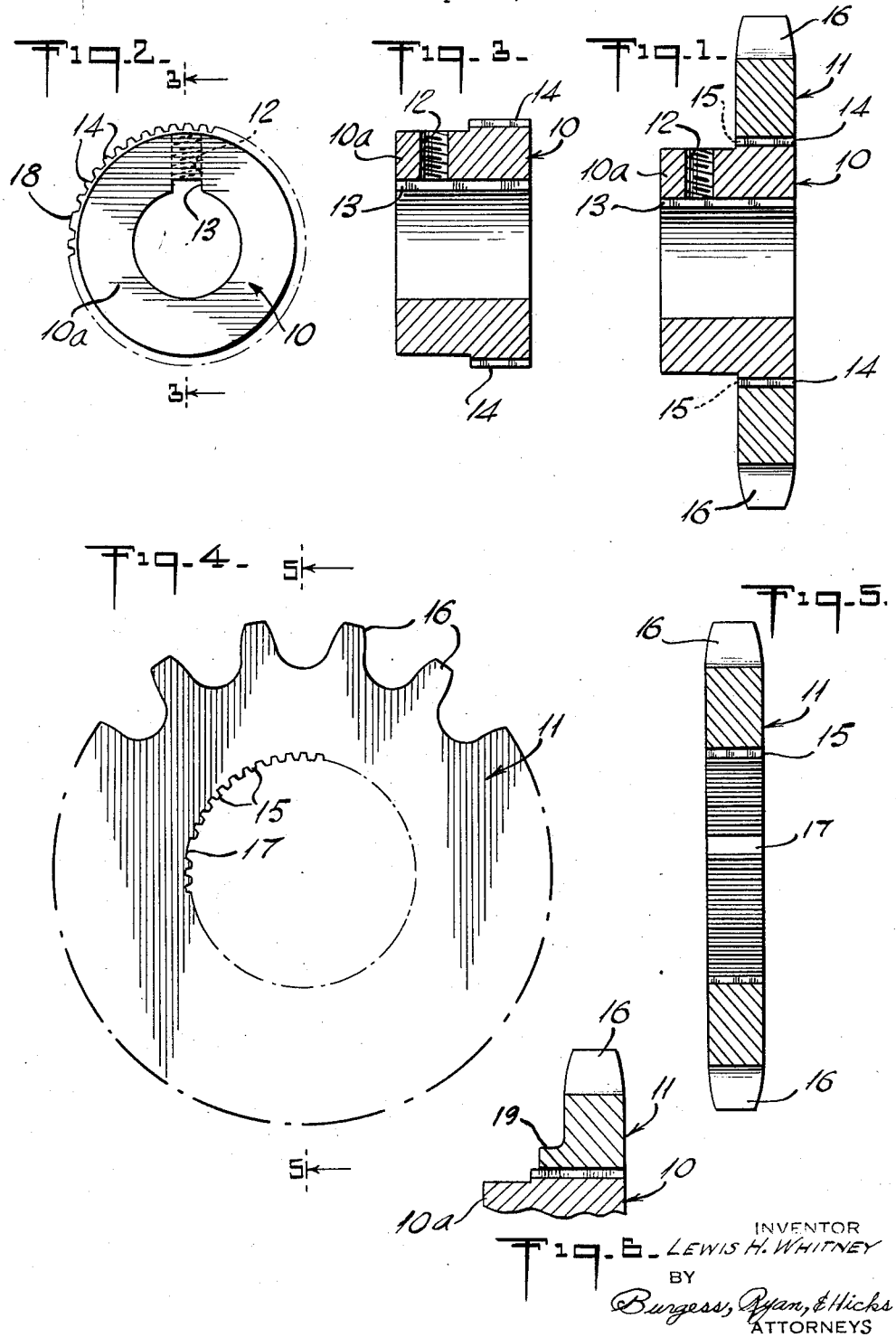
INVENTOR
*LEWIS H. WHITNEY*
BY
*Burgess, Ryan, & Hicks*
ATTORNEYS

2,932,207
CHAIN SPROCKET

Lewis H. Whitney, Farmington, Conn., assignor to Whitney Chain Company, Hartford, Conn., a corporation of Connecticut Application September 26, 1957, Serial No. 686,363

2 Claims. (Cl. 74—243)

The present invention relates to improvements in chain sprockets.

An object of the present invention is to provide chain sprockets of various sizes which may be readily assembled from interchangeable hubs and sprocket plates of different dimensions to meet customers' requirements. By providing interchangeable hubs and sprocket plates of different dimensions as separate parts, the number of parts that must be carried as inventory to meet customer demands for stock sprocket sizes can be greatly reduced.

For example, a stock of ten hubs and four sprocket plates which are interchangeable with each of the hubs will enable forty different sizes of sprockets to be supplied as required.

Another object of the present invention is to provide chain sprockets formed from interchangeable hubs and sprocket plates for the smaller sizes of sprockets which may be readily assembled by inexpensive equipment and which will maintain good structural integrity under normal chain drive conditions.

Other objects and advantages of the invention will be apparent and better understood from the following description and the accompanying drawing in which:

Fig. 1 is a side view in vertical section of a chain sprocket embodying the present invention shown on an enlarged scale;

Fig. 2 is an end view of a part of the chain sprocket shown in Fig. 1;

Fig. 3 is a section view taken along the line 3—3 of Fig. 2;

Fig. 4 is an end view of another part of the chain sprocket shown in Fig. 1;

Fig. 5 is a section view taken along the line 5—5 of Fig. 4; and

Fig. 6 is a fragmentary view in vertical section of a modification of the chain sprocket shown in Fig. 1.

Referring now to the drawing in detail, an assembled chain sprocket unit is shown in Fig. 1 in which a particular size of hub 10 is shown with a particular size of sprocket plate 11 secured thereon.

It will be understood that interchangeable hubs and sprocket plates of different sizes are provided to be assembled as shown in Fig. 1 to form sprockets having dimensions to suit the requirements of the customer.

As shown best in Figs. 2 and 3, the hub 10 has a central bore to receive a shaft (not shown). An extension 10a of the hub 10 has a threaded hole 12 therein to receive the usual set screw and the bore of the hub is also provided with the usual keyway 13 for keying the sprocket to the shaft.

The body of the hub 10 has fine splines 14 formed on its exterior surface which extend lengthwise or axially of the hub. The splines 14 are extremely fine, having a diametrical pitch of from 48/96 to 24/48 for shafts varying from one-half inch to two and one-eighth inches in diameter. As mentioned above, a number of hubs 10 having the same external dimensions are provided for different size shafts and such hubs are interchangeable with a number of sprocket plates 11 of different dimensions.

As shown best in Figs. 4 and 5, the sprocket plates 11 are annular members which have central openings therein dimensioned to fit the hubs 10 with which they are interchangeable. Each of the sprocket plates 11 also has fine splines 15 formed on the interior surface of the central opening therein and which correspond generally to the splines 14 formed on the body of the hub 10. The sprocket plates also have the usual chain engaging teeth 16 of the desired pitch formed around the exterior periphery thereof. Thus, a number of sprocket plates 11 of different pitch diameters and having teeth of different pitch are provided to be interchanged with the hubs for shafts of different sizes.

The interchangeable hubs 10 and sprocket plates 11 are assembled with a press fit to form a sprocket unit of the desired dimensions. The press fit between the hub and sprocket plate is obtained by dimensioning the splines 14 and 15 on the hub and sprocket plate, respectively, so that there will be interference between the splines on the respective parts as they are assembled. Such interference may occur at the major diameters of the splines, the minor diameters of the splines, the flanks of the splines, or at a combination of such points.

Such an arrangement permits the selected interchangeable hub and sprocket plate to be readily assembled or disassembled, as desired, by an arbor press or the like and avoids the necessity of expensive machining of the interchangeable parts or the use of special tools for their assembly. In addition, the assembled sprocket unit has sufficient structural strength and integrity to withstand normal chain drive conditions satisfactorily.

To align the interchangeable sprocket plates when they are assembled, one tooth of the splines 15 on the bore of the sprocket plate may be omitted as indicated at 17 and two teeth of the spline on the hub may be omitted as indicated at 18.

As noted above, a number of hubs are provided for different shaft sizes and a number of sprocket plates of different dimensions which are interchangeable with each of the hubs are provided. These parts are carried as separate items of stock for assembly as required to meet the customers' demands for stock chain sprocket sizes. This materially reduces the inventory that must be carried to supply chain sprockets of different pitch diameters for different shaft sizes. For example, by providing hubs having four different bores and ten sprocket plates of different dimensions which are interchangeable with the hubs, it is possible to obtain assembled sprocket units of forty different sizes from a stock of fourteen parts.

As shown in Fig. 6, the structural strength of the assembled sprocket unit may be increased by providing a boss 19 on the sprocket plate 11 adjacent the central bore therein so that the length of the splines 14 and 15 on the hub and sprocket plate, respectively, can be increased in length accordingly.

It will be understood that various modifications and changes may be made by those skilled in the art in the embodiments of the invention illustrated and described herein without departing from the scope of the invention as defined by the following claims.

I claim:

1. A chain sprocket assembly comprising a hub which includes a portion having a cylindrical exterior surface with a centrally disposed, shaft-receiving bore having a keyway therein, a series of fine splines formed on said cylindrical surface of the hub and extending lengthwise thereof in spaced parallel relation to each other around said cylindrical surface, an annular sprocket plate mounted on the cylindrical surface of said portion of the hub, said sprocket plate having an outer peripheral surface with a series of spaced sprocket teeth extending therefrom and having an inner peripheral surface defining a central opening to receive said portion of the hub, a series of fine splines formed on the inner peripheral surface of the sprocket plate and extending lengthwise thereof in spaced parallel relation to each other around said inner surface of the sprocket plate, said last-mentioned splines being arranged to mesh with the splines formed on the exterior surface of the hub and being dimensioned to make an interference fit therewith whereby the hub and the sprocket plate are removably held in assembled relation to each other and interengaging means on the sprocket plate and the hub for aligning the teeth on the sprocket plate in a single predetermined angular relation with respect to the keyway in the hub.

2. A chain sprocket assembly as defined in claim 1 wherein the interengaging means on the sprocket plate and the hub comprises an enlarged tooth formed on the exterior surface of the hub with the sprocket plate having an enlarged recess formed in the inner surface thereof to receive said enlarged tooth.

References Cited in the file of this patent
UNITED STATES PATENTS

| | | |
|---|---|---|
| 295,480 | Briggs | Mar. 18, 1884 |
| 1,231,321 | Alden et al. | June 26, 1917 |
| 1,803,995 | Chilton | May 5, 1931 |
| 2,334,320 | Evans | Nov. 16, 1943 |
| 2,673,471 | Kline et al. | Mar. 30, 1954 |

FOREIGN PATENTS

| | | |
|---|---|---|
| 786,527 | France | June 8, 1935 |